United States Patent [19]

Coppier

[11] Patent Number: 4,754,122
[45] Date of Patent: Jun. 28, 1988

[54] ELECTRIC KETTLE CONSISTING OF A VESSEL SUPPORTED ON A BASE-PLATE WHICH IS CONNECTED ELECTRICALLY TO THE POWER SUPPLY SYSTEM

[75] Inventor: Michel Coppier, Rumilly, France

[73] Assignee: SEB S.A., Selongey, France

[21] Appl. No.: 943,323

[22] Filed: Dec. 22, 1986

[30] Foreign Application Priority Data

Jan. 2, 1986 [FR] France ................... 96 00013

[51] Int. Cl.⁴ ............................................. F27D 11/00
[52] U.S. Cl. .................... 219/437; 219/432; 219/435
[58] Field of Search .............. 219/437, 507, 508, 509, 219/328, 436, 438, 441, 442, 520, 526, 430, 429, 432, 435

[56] References Cited

U.S. PATENT DOCUMENTS

| | | | |
|---|---|---|---|
| 2,266,090 | 12/1941 | Smith | 219/435 |
| 2,350,941 | 6/1944 | Stevenson | 219/432 |
| 2,528,191 | 10/1950 | Turner | 219/441 |
| 3,141,087 | 7/1964 | Schoenwald | 219/507 |
| 4,510,375 | 4/1985 | Inskip et al. | 219/437 X |

FOREIGN PATENT DOCUMENTS 445747 4/1972 Australia .
1440990 1/1969 Fed. Rep. of Germany .

*Primary Examiner*—E. A. Goldberg
*Assistant Examiner*—M. M. Lateef
*Attorney, Agent, or Firm*—Young & Thompson

[57] ABSTRACT

In an electric kettle which includes a water-heating vessel (1) and a supporting base-plate (14) connected to the power supply system by a flexible cord, it is no longer necessary to disconnect the supply cord before removing the vessel from its base-plate. The user simply pulls a trigger (20) housed within the kettle handle (21), thereby releasing electric coupling elements (16, 17; 18, 19) which connect the base-plate to the vessel.

6 Claims, 3 Drawing Sheets

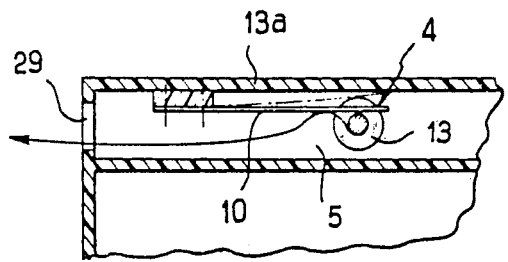 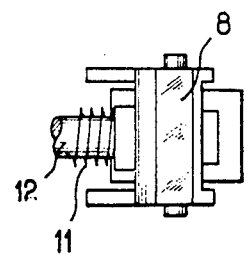
FIG_4   FIG_5
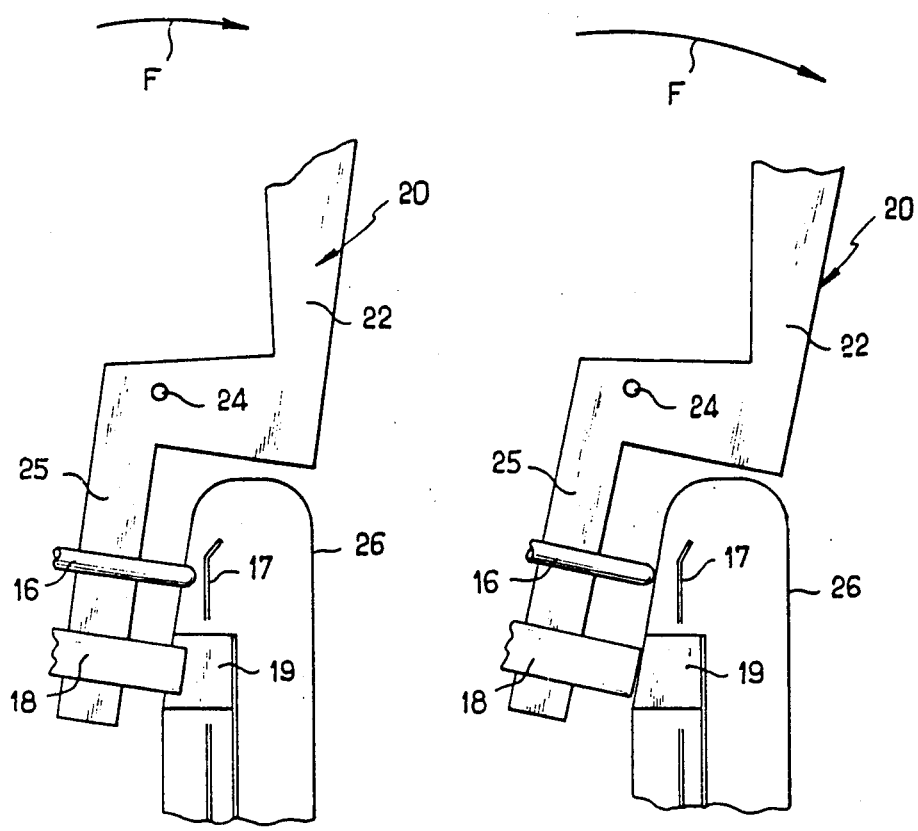
FIG_6   FIG_7

ELECTRIC KETTLE CONSISTING OF A VESSEL SUPPORTED ON A BASE-PLATE WHICH IS CONNECTED ELECTRICALLY TO THE POWER SUPPLY SYSTEM

BACKGROUND OF THE INVENTION

1. Field of the Invention

The present invention relates to an electric kettle composed of a water vessel and a base-plate on which the vessel rests, the base-plate being connected electrically on the one hand to the power supply system by means of a flexible cord and on the other hand to the water vessel by means of movable electric coupling elements.

2. Description of the Prior Art

In known electric kettle designs, when the water within the vessel attains the desired temperature, the supply cord which is connected to the base-plate must be detached by the user before removing the vessel from the base-plate. This precaution is necessary in order to guard against arcing at the level of the electrical connections between container and base-plate, thus imposing a constraint on the user.

In some designs, the base-plate is provided with microswitches which automatically cut-off the electric power supply when the vessel is disconnected from the base-plate. However, these microswitches increase the cost of manufacture of kettles of this type.

The aim of the present invention is to overcome the disadvantages of known designs by providing an electric kettle which makes it possible to cut-off the supply of electric current to the vessel as soon as the user takes hold of the vessel without any need to disconnect the flexible supply cord which is connected to the base-plate.

SUMMARY OF THE INVENTION

The invention is directed to an electric kettle comprising a vessel for containing water, a heating resistor within said vessel and a temperature limiter adapted to cut-off the supply of current to the heating resistor when the steam temperature of the water contained in the vessel attains the desired value. The water vessel is supported on a base-plate which is electrically connected to the power supply system, said base-plate being also electrically connected to the vessel by means of movable coupling elements.

The electric kettle in accordance with the invention is essentially provided with a trigger which can be actuated by the user in order to release the electric coupling elements which connect the base-plate to the vessel.

Thus, when it is desired to remove the vessel containing hot water from the base-plate, the user pulls the trigger, thus interrupting the supply of electric current and automatically releasing the electric coupling elements which connect the base-plate to the vessel.

In an advantageous embodiment of the invention, the trigger is housed within a handle which is attached laterally to the water vessel.

Thus, as soon as the user grips the vessel handle, he or she is necessarily obliged to actuate the trigger which is fixed within said handle.

In a preferred embodiment of the invention, the trigger is provided with a lever which is partially sunk within the handle and actuated by a restoring spring, said lever being pivotally mounted on a pin located at the lower end of the handle. Said lever is provided beneath its pivot-pin with a downward extension in the form of an arm which extends in proximity to the side wall of the vessel. Said extension arm is adapted to carry electric coupling elements which extend in a direction substantially parallel t the base-plate and are adapted to cooperate with complementary electric coupling elements arranged within a lateral connection box which is rigidly fixed to the base-plate.

Thus, when the user pulls the trigger, the lever extension ar which is joined to said trigger undergoes a lateral pivotal displacement, with the result that the electric coupling elements attached to said extension arm are moved away from the coupling elements which are attached to the lateral connection-box of the base-plate.

This pivotal movement of the extension arm which is joined to the trigger makes it possible at the same time to release the vessel from the base-plate.

The electric kettle in accordance with the invention is preferably provided with a temperature limiter in cooperating relation with a toggle switch which automatically cuts off the supply of electric current to the heating resistor of the vessel when the temperature of the water within said vessel attains the desired value.

In accordance with a preferred embodiment of the invention, the trigger is adapted to cooperate with the switch in order to "clear" the temperature limiter or in other words to put the switch in the current-interruption position when the user pulls the trigger.

In consequence, the trigger of the kettle in accordance with the invention has the following three functions in succession:

interruption of current supply to the heating resistor, disconnection of the phase connections, opening of ground connections and reclosing of the electric coupling elements between the vessel and the base-plate, releasing and re-locking of the vessel on the base-plate.

BRIEF DESCRIPTION OF THE DRAWINGS

FIG. 4 is a sectional view taken along the plane IV—IV of FIG. 1.

FIG. 5 is a top view of the switch and of the rear portion of the operating stem of the temperature limiter.

FIG. 6 is a fragmentary schematic view of the trigger and of the base-plate connection box, the electric coupling elements having been partially released.

FIG. 7 is a view which is similar to FIG. 6, the trigger being fully engaged and released from the base-plate connection box.

DESCRIPTION OF THE PREFERRED EMBODIMENTS

Figure 1:
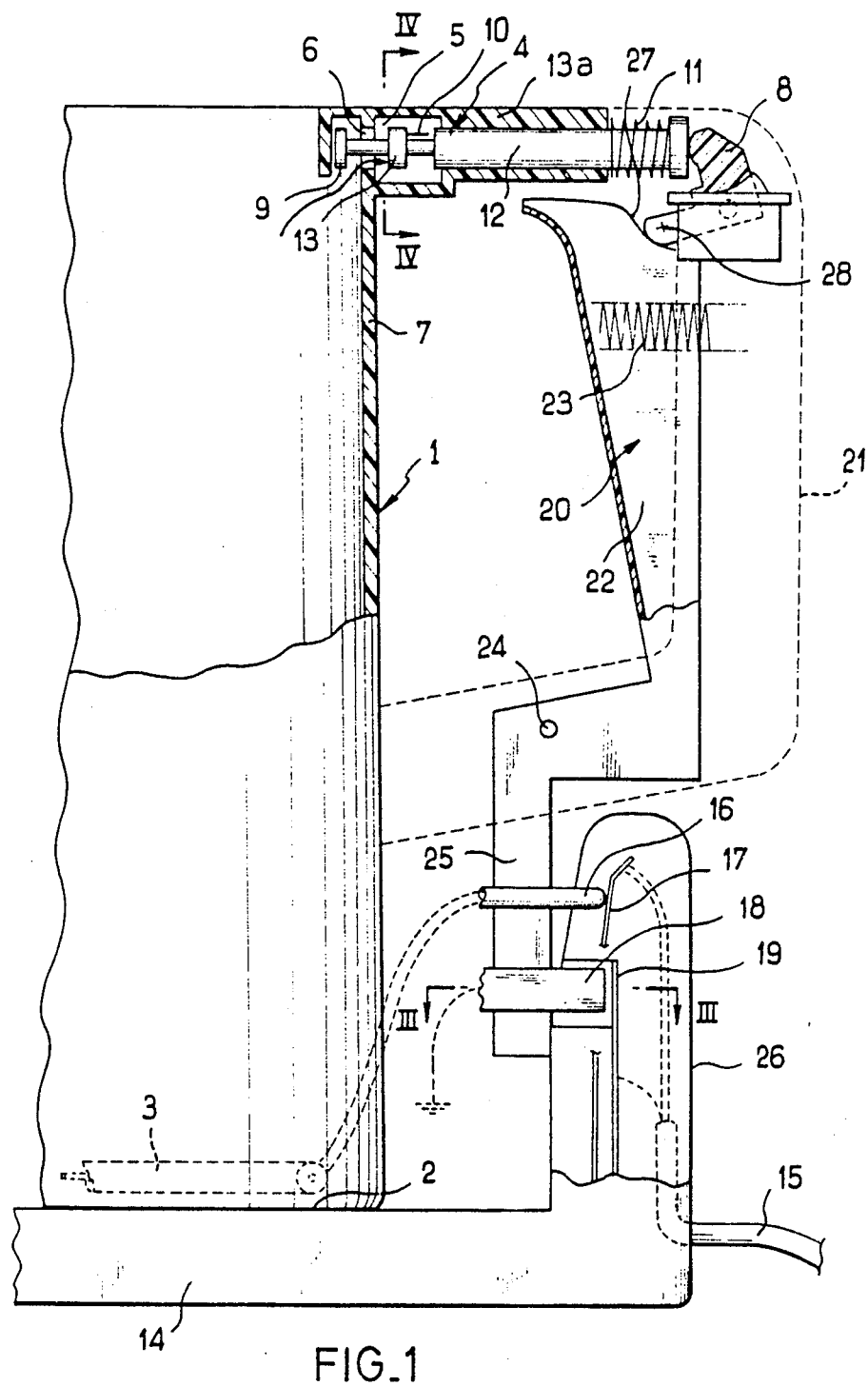
FIG. 1 is a schematic view in elevation with portions broken away and in longitudinal cross-section showing an electric kettle in accordance with the invention, the temperature limiter being in the set position and the trigger being shown in the position of locking and electrical connection with respect to the base-plate of the kettle.

In the embodiment of FIG. 1, the electric kettle comprises a vessel 1 for containing water, said vessel being provided in proximity to its base-plate 2 with a heating resistor 3. At the upper end of the vessel 1 is placed a temperature limiter 4 which is adapted to cut-off the supply of electric current to the resistor 3 when the steam temperature of the water within the vessel 1 attains the desired value.

Said temperature limiter 4 is placed within a chamber 5 which communicates with the interior of the vessel 1 through an orifice 6 formed in the top portion of the side wall 7 of the vessel 1. Said temperature limiter 4 can be manually reset by the user by means of a toggle switch 8.

Figure 2:
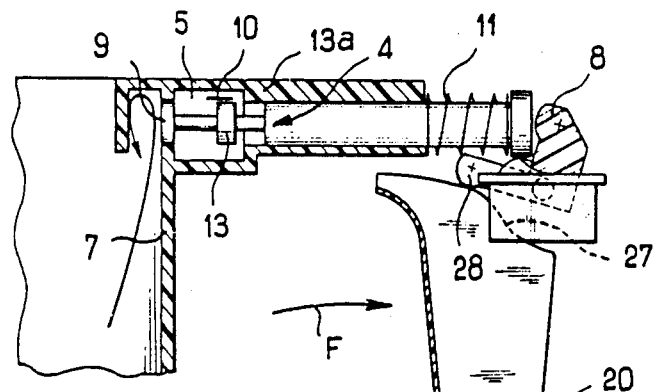
FIG. 2 is a schematic view which is similar to FIG. 1, except for the fact that the vessel and the base-plate of the kettle have been suppressed, and which shows the temperature limiter in the current-interruption position.
Figure 2:
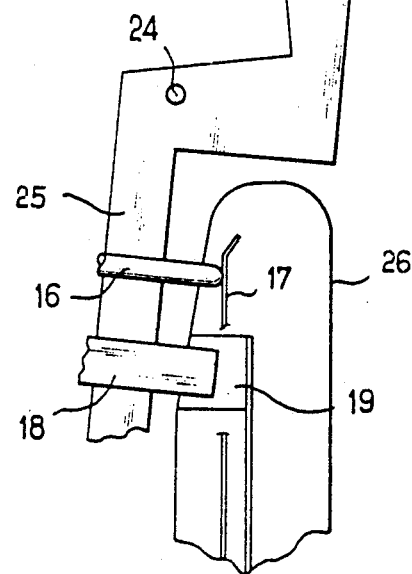

The temperature limiter 4 is adapted to cooperate with a member 9 consisting of a valve head which automatically closes the orifice 6 of the chamber 5 as soon as said temperature limiter 4 has moved to the current-interruption position, or position in which the supply of electric current to the heating resistor 3 is cut-off, as indicated in FIG. 2.

The temperature limiter 4 includes a bimetallic strip 10 (as also shown in FIG. 4) designed to undergo deformation as a function of the steam temperature to which it is directly exposed. The bimetallic strip 10 is adapted to move by deformation between a position (shown in FIG. 1) in which the valve head 9 is retained by the bimetallic strip 10 and frees the orifice 6 and a position (shown in FIG. 2) in which said bimetallic strip 10 releases the valve head 9 and in which a restoring spring 11 moves the valve head 9 to a position (shown in FIG. 2) in which said valve head closes the orifice 6 of the chamber 5 and at the same time moves the aforementioned toggle switch 8 to a position in which the supply of electric current to the heating resistor 3 is cut-off.

In the embodiment illustrated, the valve head 9 is carried by a stem 12 slidably mounted within a body 13a. Said valve stem extends through the chamber 5 and through the orifice 6 which opens into the interior of the vessel 1.

That end of said valve stem 12 which is remote from the valve head 9 is in contact with the toggle switch 8.

That portion of the valve stem 12 which is located within the chamber 5 has an annular abutment shoulder 13 which (as shown in FIG. 1) is applied against the bimetallic strip 10 under the action of the restoring spring 11 when said bimetallic strip 10 is at a temperature below the desired value.

The spring 11 which is mounted on the valve stem 12 is designed to move the stem 12 towards the toggle switch 8 and thus to bring the valve head 9 to the position of closure of the orifice 6 of the chamber 5 when the bimetallic strip 10 releases the annular abutment shoulder 13 of the valve stem, as indicated in FIG. 2 (see also the position of the bimetallic strip 10 as represented by a chain-dotted line in FIG. 4).

The toggle switch 8 is designed for manual operation by the user in order to produce a displacement of the valve stem 12 and its annular abutment shoulder 13 to a position in which the stem is locked with respect to the bimetallic strip 10 and in which the orifice 6 of the chamber 5 is open. This displacement is carried out in opposition t the action of the restoring spring 11.

In the embodiment shown in FIG. 1, the vessel 1 rests on a base-plate 14 which is connected electrically to the flexible supply cord 15, said cord being in turn connected to the power supply system. Said base-plate 14 is also connected electrically to the vessel 1 by means of movable electric coupling elements 16, 17; 18, 19.

A trigger 20 which is attached to the vessel 1 and designed to be actuated by the user is intended to free the electric coupling elements 16, 17; 18, 19 which have the function of connecting the base-plate 14 to the vessel 1.

Said trigger 20 is housed within a handle 21 which is attached laterally to the vessel 1.

Said trigger 20 is constituted by a lever 22 which is partially sunk within the handle 21 and controlled by a restoring spring 23. The lever 22 is pivotally mounted on a pin 24 located at the lower end of the handle 21 and is provided beneath the pivot-pin 24 with a downward extension in the form of an arm 25 which extends in a substantially vertical direction in proximity to the side wall 7 of the vessel 1.

Said extension arm 25 is adapted to carry electric coupling elements 16, 18 which extend in a direction substantially parallel to the base-plate 14 and are connected to complementary electric coupling elements 17, 19 arranged within a lateral connection box 26 which is rigidly fixed to the base-plate 14.

The electric coupling elements 16 carried by the extension arm 25 of the trigger 20 consist of two metallic connector-pins which are in contact with two resilient metallic strips 17, said strips being fixed within the connection box 26 and connected to the two conductors of the flexible supply cord 15.

Figure 3:
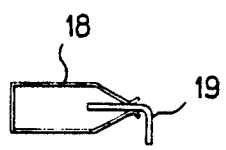
FIG. 3 is a sectional view taken along the plane III—III of FIG. 1.

The electric coupling element 19 which is fixed within the connection box 26 is connected to the ground lead. This coupling element 19 is a bent metallic strip, the end of which is frictionally engaged within the electric coupling element 18 in the form of a spring clip as shown in FIG. 3.

In the service position as indicated in FIG. 1, the electric coupling elements 16, 18 which are attached to the extension arm 25 and are engaged within recesses of the connection box 26 have the function of locking the vessel 1 on the base-plate 14.

Furthermore, the trigger 20 is adapted to cooperate with the toggle switch 8 in order to "clear" the temperature limiter 4 or in other words to interrupt the supply of electric current to the resistor 3 when the user pulls the trigger 20.

To this end, the top portion of the lever 22 of the trigger 20 has a guide ramp 27 which is applied against one arm 28 of the toggle switch 8.

The operation of the electric kettle described in the foregoing will now be explained.

It will be assumed at the outset that the kettle is in the service position as illustrated in FIG. 1.

In this position, the temperature limiter 4 is set, the bimetallic strip 10 maintains the valve head 9 in the position of withdrawal from the orifice 6 and the heating resistor 3 is supplied with electric current.

The steam formed within the vessel 1 communicates with the interior of the chamber 5 and escapes to the exterior through the orifice 29 (as shown in FIG. 4).

When the steam attains a predetermined temperature, the bimetallic strip 10 is deformed and moves away from the annular abutment shoulder 13. The valve stem 12 is then thrust by the spring 11 against the toggle switch 8 and initiates changeover of this latter (see FIG. 2), thus cutting-off the supply of electric current to the heating resistor 3. At the same time, the valve head 9 closes the orifice, thus preventing admission of steam into the chamber 5.

In order to remove the vessel 1 from the base-plate 14, the user only has to pull the trigger 20 in the direction of the arrow F indicated in FIG. 2.

As soon as the user presses the trigger 20, the toggle switch 8 is "flipped" to its stop position (as shown in FIG. 2), with the result that the power supply to the heating resistor 3 is cut-off.

When the user continues to press the trigger 20 (see FIG. 6), the electric coupling elements 16 and 17 are released prior to the electric coupling elements 18 and 19, thus making it possible to open the phase connections whilst the kettle unit still remains connected to ground without any attendant danger of arc formation since the toggle switch 8 is in the open-circuit position.

At the end of travel of the trigger 20 (see FIG. 7), the electric coupling elements 16, 18 of the extension arm 25 are completely released from the connection box 26 and the vessel 1 is then completely released from the base-plate 14.

At the time of relative motion of the electric coupling elements 16, 17 and 18, 19, these elements are in frictional contact and thus maintain a low value of electrical contact resistance between said coupling elements.

Moreover, when the vessel 1 is replaced on the base-plate 14, it is impossible for the user to reset the temperature limiter 4 as long as the trigger 20 is not in the rest position as indicated in FIG. 1 in which the electric coupling elements 16, 17 are fully engaged within the connection box 26.

The electric kettle in accordance with the invention therefore provides the user with a high degree of operational safety.

After using the hot water contained in the vessel, the user can immediately reset the temperature limiter 4. This is due to the fact that, since the valve head 9 shuts-off the orifice 6 of the chamber 5, the bimetallic strip which is no longer in contact with hot steam undergoes rapid cooling and consequently returns at high speed to its normal position in which it locks the annular abutment shoulder 13 in position when the temperature limiter 4 is put in the reset position.

What is claimed is:

1. An electric kettle comprising a vessel (1) for containing water, a heating resistor (3) within said vessel and a temperature limiter (4) adapted to cut off the supply of current to the heating resistor when the steam temperature of the water contained in the vessel attains the desired value, the vessel (1) being removably supported on a base plate (14) which is adapted to be electrically connected to a power supply system, said base plate being also adapted to be electrically connected to the vessel by means of movable coupling elements (16, 17; 18, 19), wherein said kettle is provided with a trigger (20) housed within a handle (21) which is attached laterally to the vessel (1), said trigger (20) being provided with a lever (22) partially sunk within said handle (21) and pivotally mounted at the lower end thereof, said lever (22) being provided beneath its pivot point with a downward extension in the form of an arm (25) which extends in proximity to the side wall (7) of the vessel (1), said extension arm (25) carrying electric coupling elements (16, 18) which extend in a direction substantially parallel to the base plate (14) and are adapted, in the service position of the kettle, to cooperate by engagement thereof within recesses of a lateral connection box (26) rigidly fixed to the base plate (14), with complementary electric coupling elements (17, 19) arranged within said box (26), whereby when the vessel (1) rests on the base plate (14) the trigger (20) can be actuated by the user in order to release the electric coupling elements (16, 17; 18, 19) from electric contact with each other before removing the vessel (1) from the base plate (14).

2. An electric kettle according to claim 1, wherein the lever (22) is actuated by a restoring spring (23), said lever being pivotally mounted on a pin (24) located at the lower end of the handle (21).

3. An electric kettle according to claim 1, wherein one pair (18, 19) of the complementary pairs of electric coupling elements is connected to ground.

4. An electric kettle according to claim 1, wherein the complementary electric coupling elements are adapted to cooperate in frictional contact with each other.

5. An electric kettle according to claim 1 in which the temperature limiter (4) is adapted to cooperate with a toggle switch (8) providing resettable and clearable changeover action, wherein the trigger (20) is adapted to cooperate with said toggle switch (8) for clearing said temperature limiter (4) when the user pulls the trigger (20).

6. An electric kettle according to claim 5, wherein the top portion of the lever (22) of the trigger has a guide ramp (27) applied against one arm (28) of the toggle switch (8).

* * * * *

UNITED STATES PATENT AND TRADEMARK OFFICE
CERTIFICATE OF CORRECTION

PATENT NO. : 4,754,122
DATED : June 28, 1988
INVENTOR(S) : Michel COPPIER

It is certified that error appears in the above—identified patent and that said Letters Patent is hereby corrected as shown below:

On the Title Page:

In the caption of the patent, under "Foreign Application Priority Data", change "96 00013" to --86 00013--.

Signed and Sealed this

Fifteenth Day of November, 1988

Attest:

DONALD J. QUIGG

*Attesting Officer*      *Commissioner of Patents and Trademarks*